(12) United States Patent
Reece et al.

(10) Patent No.: US 7,277,738 B2
(45) Date of Patent: Oct. 2, 2007

(54) INTEGRATED ANTENNA AND PC CARD CARRYING CASE

(75) Inventors: John K. Reece, Colorado Springs, CO (US); John L. Aden, Ocala, FL (US)

(73) Assignee: Intel Corporation, Santa Clara, CA (US)

( * ) Notice: Subject to any disclaimer, the term of this patent is extended or adjusted under 35 U.S.C. 154(b) by 534 days.

(21) Appl. No.: 10/403,432

(22) Filed: Mar. 31, 2003

(65) Prior Publication Data

US 2005/0261027 A1    Nov. 24, 2005

(51) Int. Cl.
*H04M 1/00* (2006.01)
(52) U.S. Cl. .............................. 455/575.7; 455/575.1; 455/575.3
(58) Field of Classification Search ............ 455/575.1, 455/575.3, 575.7; 343/702
See application file for complete search history.

(56) References Cited

U.S. PATENT DOCUMENTS

| | | | | |
|---|---|---|---|---|
| 5,701,515 A | * | 12/1997 | Gradeler | 710/14 |
| 5,828,346 A | * | 10/1998 | Park | 343/826 |
| 5,898,933 A | * | 4/1999 | Kaschke | 455/575.7 |
| 6,172,645 B1 | * | 1/2001 | Hollander et al. | 343/702 |
| 6,181,284 B1 | * | 1/2001 | Madsen et al. | 343/702 |
| 6,509,876 B1 | * | 1/2003 | Jones et al. | 343/702 |
| 6,545,643 B1 | * | 4/2003 | Sward et al. | 343/702 |
| 6,561,328 B1 | * | 5/2003 | Huang | 190/18 A |
| 6,731,951 B1 | * | 5/2004 | Takebe et al. | 455/557 |
| 2003/0100352 A1 | * | 5/2003 | Moles | 455/572 |

* cited by examiner

*Primary Examiner*—Sanh D. Phu
(74) *Attorney, Agent, or Firm*—Trop, Pruner & Hu, P.C.

(57) ABSTRACT

A carrying case for a personal computer card may include an integral antenna. The carrying case may be secured onto a laptop computer so that the antenna extends above the laptop computer. The case may include a pair of hingedly connected portions, one of which may extend along the screen of the laptop computer and the other which may extend above the laptop computer while the case is secured to the upper edge of the laptop computer display screen. A cable may extend from the antenna within the case down to a personal computer card plugged into the computer.

19 Claims, 7 Drawing Sheets

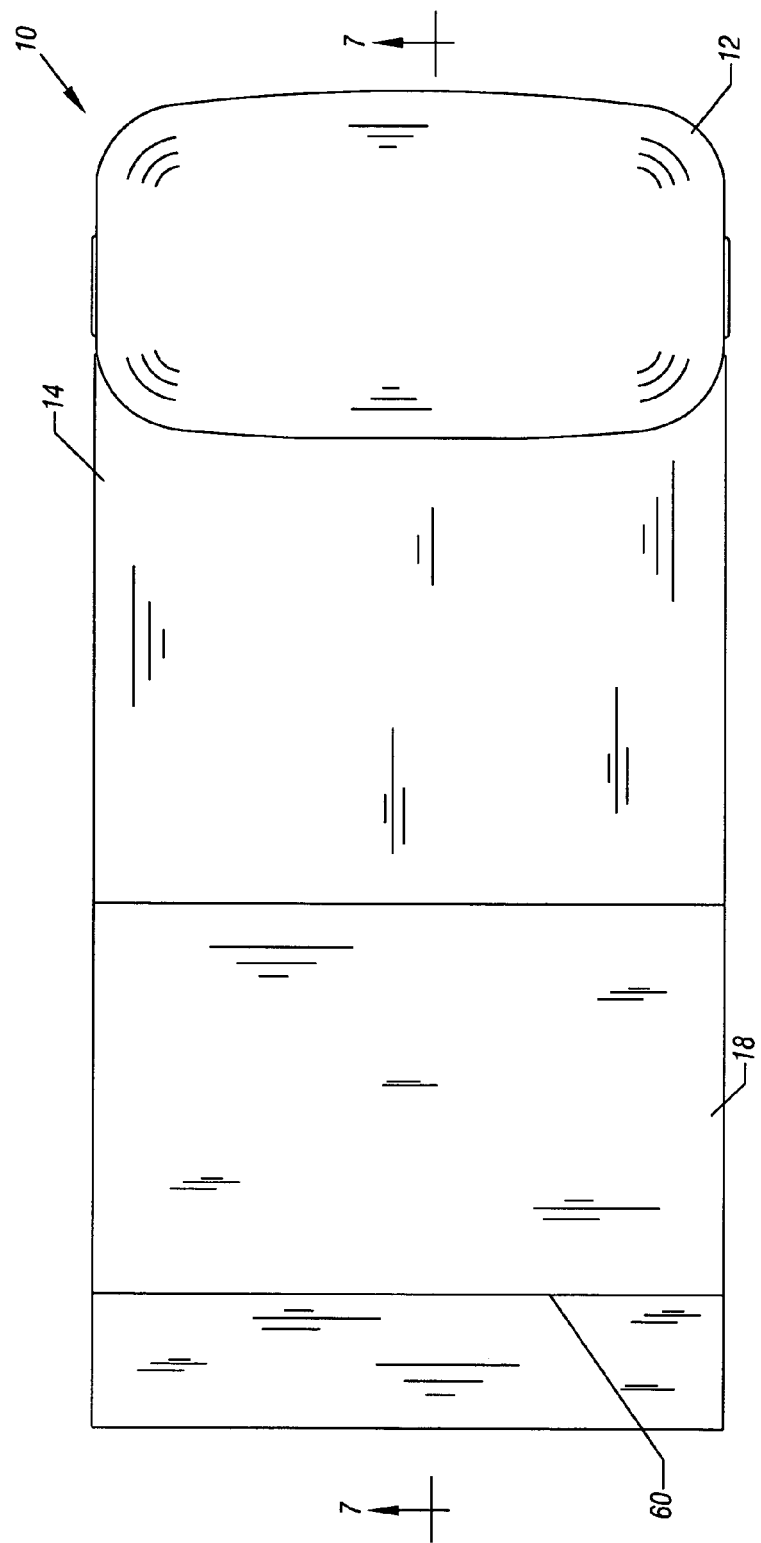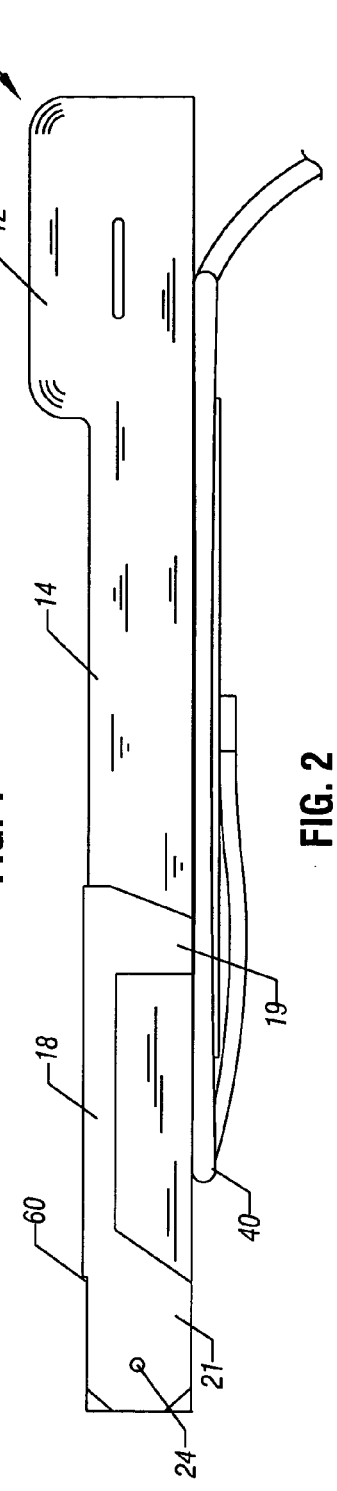

INTEGRATED ANTENNA AND PC CARD CARRYING CASE

BACKGROUND

This invention relates generally to antennas for processor-based systems and, particularly, to antennas usable with personal computer cards.

A personal computer card or PC card is a removable add-in that plugs into a slot to accommodate a modem, fax, network card, wireless communication device or storage device. Typically, these cards plug into laptop or mobile computers and provide added functions not available with the computer as purchased.

One application for PC cards is providing a wireless modem function. The card may include the wireless network interface circuitry and an antenna that enables the computer to act as a wireless terminal.

Current wireless modem PC cards use fixed or removable antennas that flip-up into a vertical position when the card is installed into the computer. These antennas may have radio frequency performance disadvantages including limited gain, corrupt radiation patterns, and unbalanced feed points close to the computer processor and digital transport mediums.

Thus, there is a need for better ways to provide for radio reception and transmission in connection with PC cards.

BRIEF DESCRIPTION OF THE DRAWINGS

FIG. 1 is a top plan view of one embodiment of the present invention;

FIG. 2 is a side elevational view of the embodiment shown in FIG. 1;

DETAILED DESCRIPTION

Referring to FIG. 1, a carrying case 10 for a wireless modem PC card may include an enlarged portion 12 and a hinged top portion 14 in one embodiment. A PC card (not shown in FIG. 1) may be positioned under the top portion 14 and the enlarged portion 12 in one embodiment of the present invention.

Figure 5:
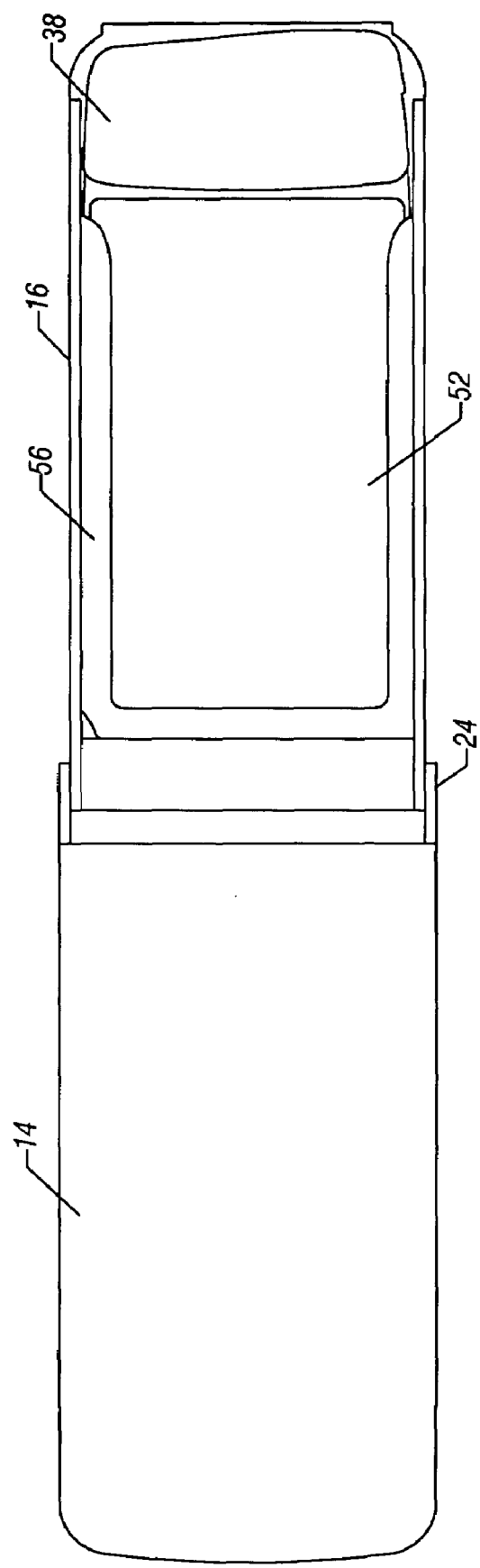
FIG. 5 is a top plan view of one embodiment of the present invention in an opened configuration.

Referring to FIG. 2, the top portion 14 may be connected to a bottom portion 16 by a hinge 24 in one embodiment. As a result, the top portion 14 may open on the hinge 24 to enable access to the PC card 52 as indicated in FIG. 5. There, the top portion 14 has been hinged open, revealing a PC card 52 with an enlarged portion 38. The card 52 may be slidably received in a slot defined by a peripheral, L-shaped receiver 56 on the bottom portion 16 so that the card 52 may slide out and away from the hinge 24.

Figure 3:
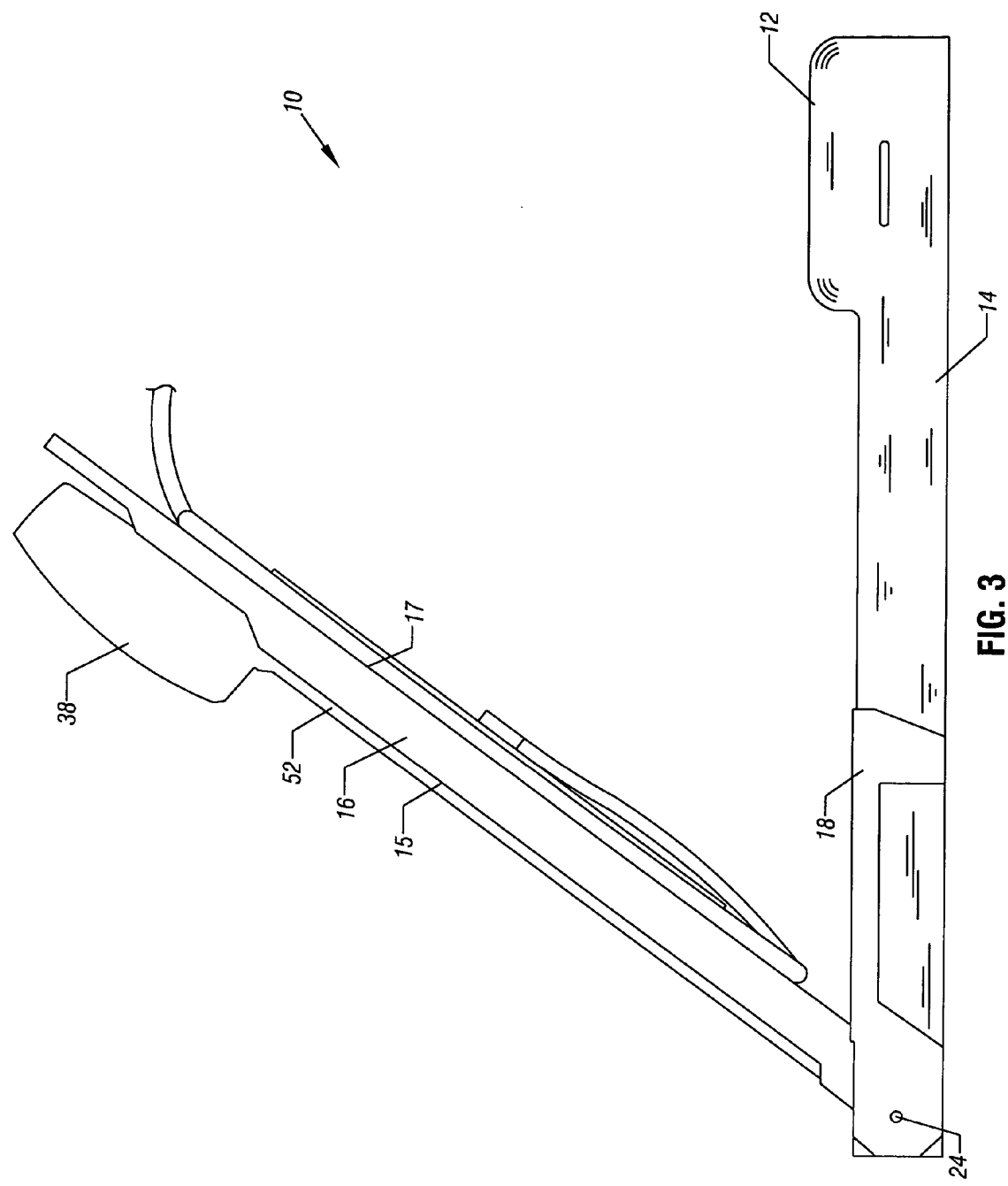
FIG. 3 is a view of the embodiment shown in FIG. 2 in a partially open configuration in accordance with one embodiment of the present invention.

Referring to FIG. 3, the case 10's top portion 14 and bottom portion 16 may be connected by the hinge 24 that allows the bottom portion 16 to pivot relative to the top portion 14. The bottom portion 16 may be rotated counter-clockwise about 300 degrees from a closed position of FIG. 2, while the top portion 14 may remain fixed. The lower edge of the top portion 14 may sit on a horizontal surface, such as a desk in one example. Then, the bottom portion 16 is elevated to extend an antenna in the bottom portion 16 into the air. The hinge 24 may be adapted to hold the bottom portion 16 at a displaced position relative to the top portion 14 in some embodiments. The card 52 may be removed and plugged into a computer slot so that an antenna in the portion 16 acts as an elevated antenna for the card 52.

The bottom portion 16 may include an upper surface 15 and a lower surface 17. In the closed position shown in FIG. 1, only the lower surface 17 may be exposed in one embodiment.

The top portion 14 may include a hinged catch 18. The catch 18 may be pivotally connected by the hinge 24 to the top portion 14 for angular rotation counterclockwise relative to the top portion 14. The catch 18 may include a receiving portion 21 and a transverse prong 19 on its free end.

Figure 4:
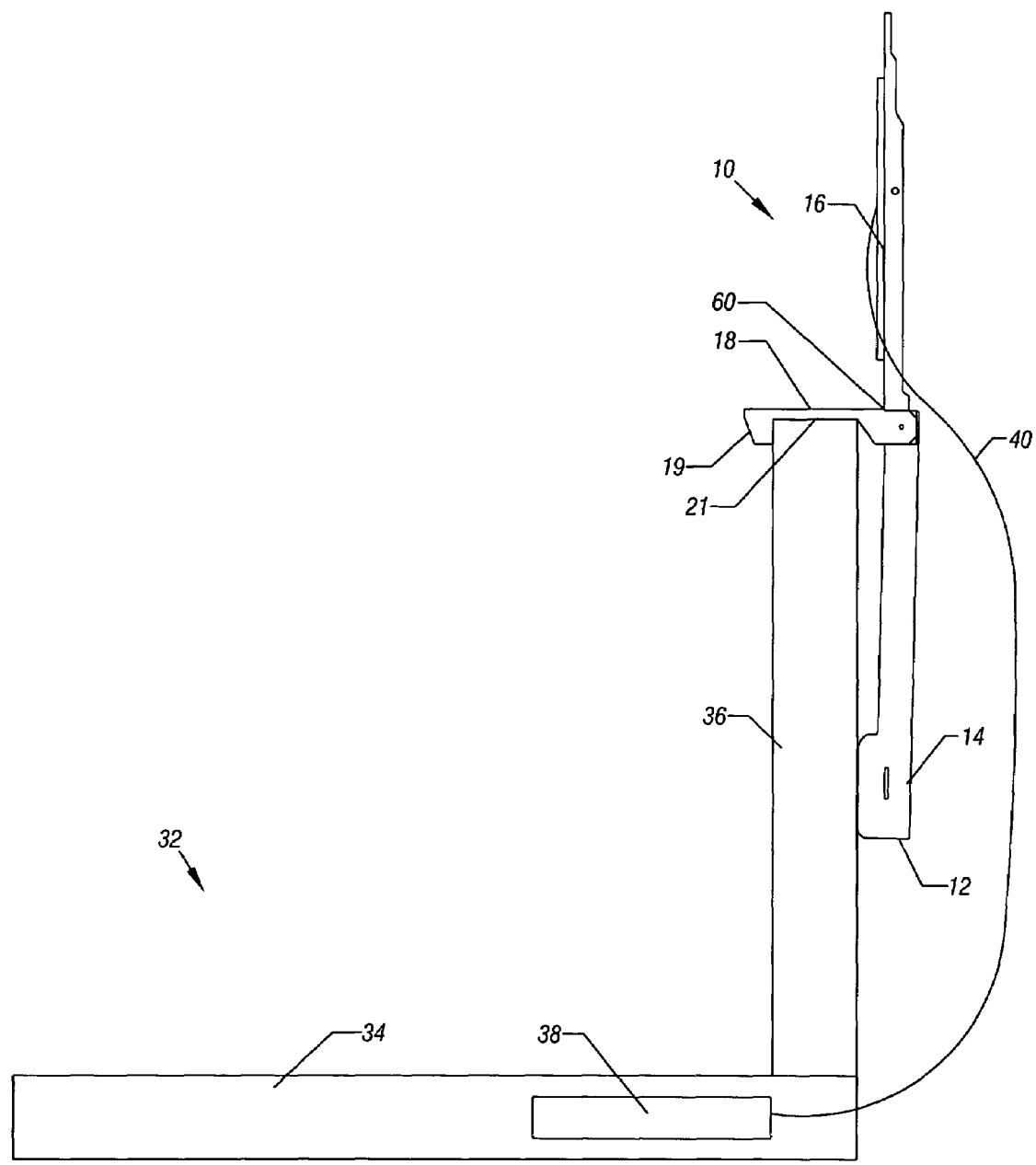
FIG. 4 is a side elevational view of one embodiment of the present invention in position on a laptop computer.

Referring to FIG. 4, the case 10 may be opened to have an elongated configuration, with the top portion 14 extending along the back surface of the display screen 36 of a laptop computer 32. The catch 18 may be pivoted so that the prong 19 is latched over the top of the display screen 36. Then the case 10 is mounted on the screen 36 due to the limited angle of upward rotation of the catch 18. In one embodiment, the edge 60 of the catch 18 engages the lower portion 16 to prevent further upward rotation of the catch 18. The receiving portion 21 may engage the upper edge of the display screen 36. The top portion 14 may provide further stability to the structure by extending along the back side of the display screen 36. A cable 40 may couple the lower portion 16 electrically to the PC card 52, removed from the case 10, and positioned in a PC card slot in the base 34 of the laptop computer 32.

In this configuration, an antenna (not shown) on the lower portion 16 provides wireless reception for the PC card 52 that may be a wireless modem card in one embodiment of the present invention. By extending the antenna upwardly in a vertical direction, improved radio frequency performance may be achieved in some embodiments. Moreover, by positioning the antenna at a higher position over the laptop computer 32, radio frequency transmission and reception may be improved in some cases. Also, the antenna may be spaced from the card 52 and the electronics (not shown) that may be contained in the base 34 of the laptop computer 32.

Figure 6:
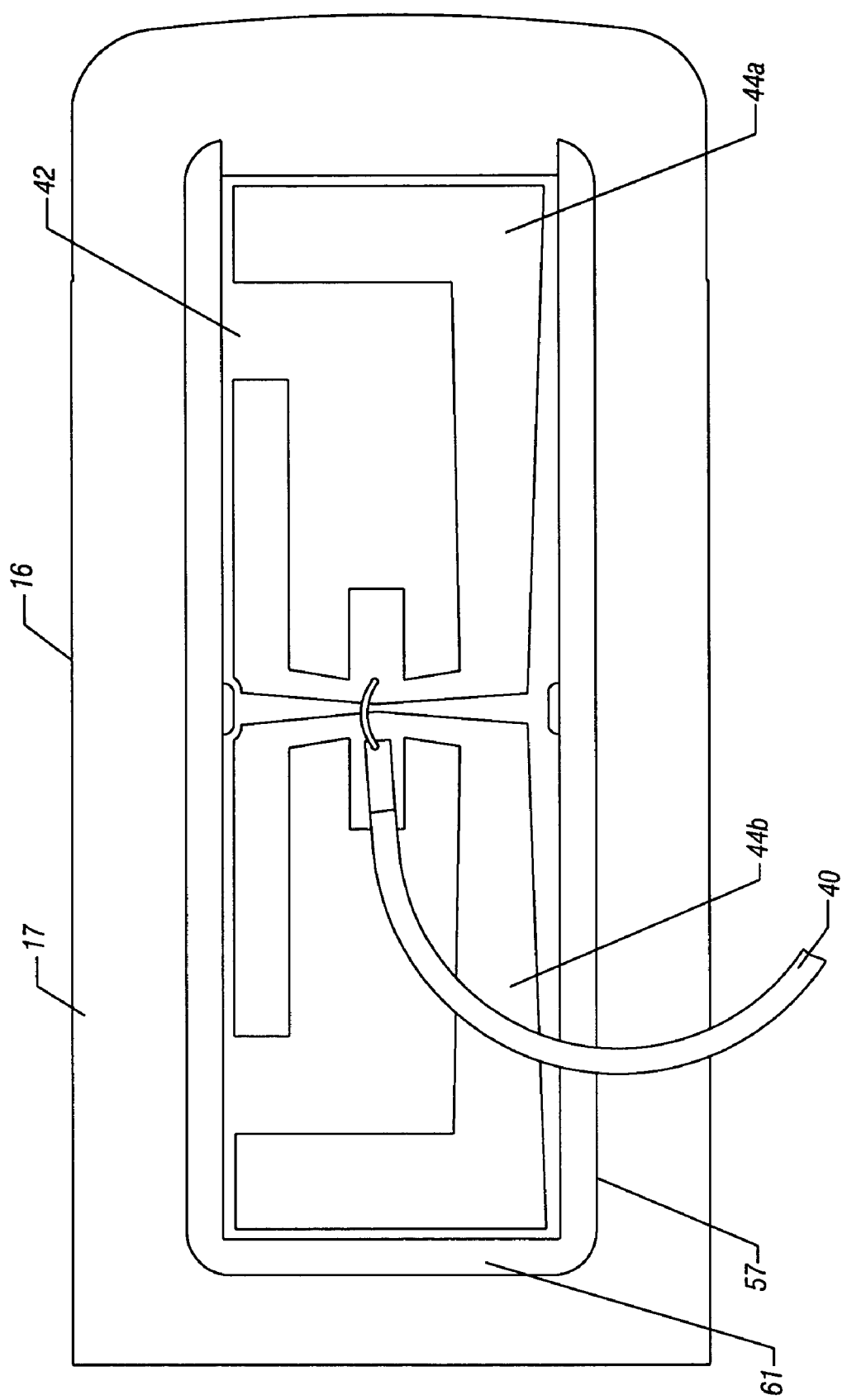
FIG. 6 is a top plan view of a portion of the embodiment shown in FIG. 5 in one embodiment with the cable in use.

Referring to FIG. 6, the lower surface 17 of the bottom portion 16 may receive a pair of dipole antenna portions 44a and 44b. In one embodiment, the antenna portions 44 may have an almost closed C-shaped configuration. The wires 40 make an electrical connection to each antenna portion 44a. The wires 40 then may extend downwardly along the length of the screen 36 to the PC card 52 in one embodiment of the present invention shown in FIG. 4. In one embodiment, each antenna portion 44 may be a planar metallization deposited on a flexible printed circuit board 42. The board 42 may be slidably and removably engaged within an L-shaped bracket 61.

Figure 7:
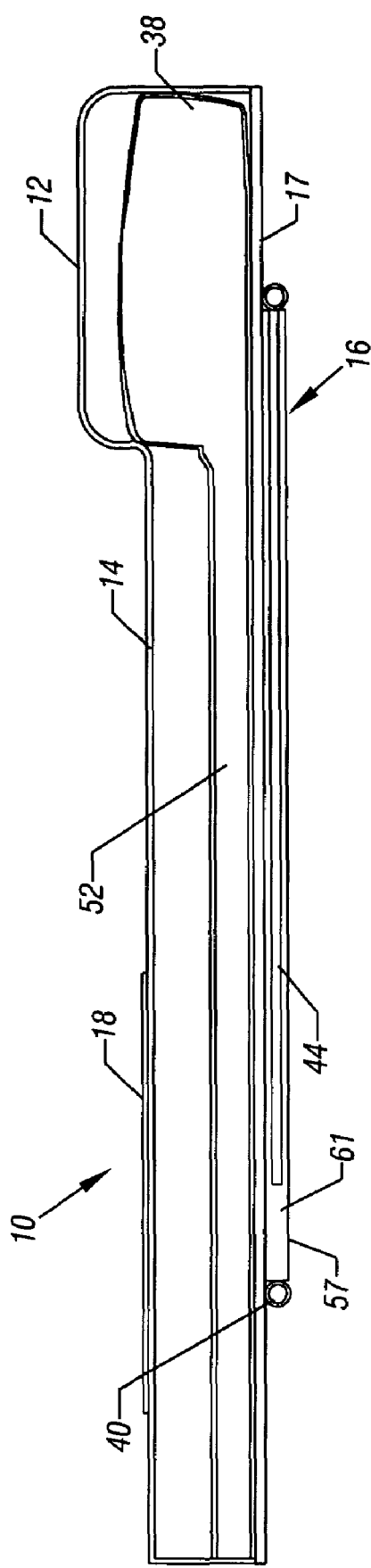
FIG. 7 is a cross-sectional view taken generally along the line 7-7 in FIG. 1.

Referring to FIG. 7, on the surface 17 of the bottom portion 16 opposite to the surface 15 shown in FIG. 3, the wires 40 may be wrapped around a cable organizer 57 and provided in a coiled configuration for eventual use. In one embodiment, the cable organizer 57 may be the exterior of the bracket 61. The free ends of the wires 40 may have a connector for removably electrically coupling to the PC card 52.

In some embodiments of the present invention, the antenna portions 44 may provide improved radio frequency performance including better gain, better radiation patterns, and the reduction of unbalanced feed points close to the processor and digital transport mediums. Thus, improved radio frequency performance can be achieved in some embodiments. The present invention may be applicable to processor-based systems in a wide variety of situations that use a PC card.

Figure 8:
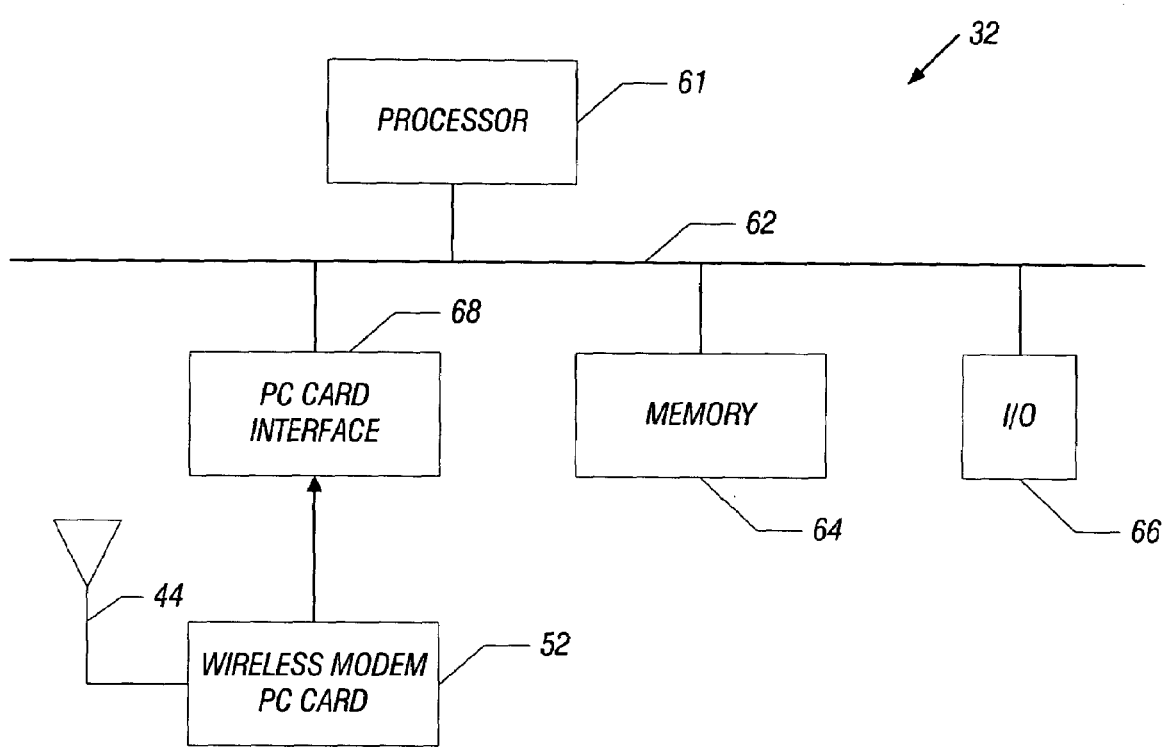
FIG. 8 is a system schematic depiction of one embodiment of the present invention.

Referring to FIG. 8, in accordance with one embodiment of the present invention, a processor-based system 32 may include a processor 61 coupled by a bus 62 to a memory 64, such as a system memory. An input/output (I/O) interface 66 may also be provided on the bus 62 in some embodiments.

The PC card 52 may provide a card interface 68 for the processor-based system 32. In one embodiment, the interface 68 may be a global system for mobile communications (GSM) wireless transceiver. It may receive a wireless modem PC card 52 in a sliding or plugging engagement. The card 52 may be coupled to the antenna portions 44 to form a dipole antenna in one embodiment of the present invention.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A carrying case for a personal computer card comprising:
    an enclosure to receive a personal computer card, said enclosure being operable to enable removal of said card from said enclosure for insertion of said card without said enclosure into a personal computer, said enclosure including an upper portion and a lower portion hingedly connected to one another; and
    an antenna that is part of said enclosure.

2. The case of claim 1 wherein said enclosure opens to allow access to the card.

3. The case of claim 1 wherein said enclosure includes a catch to secure said enclosure to a personal computer display screen.

4. The case of claim 3 wherein said catch to engage the upper edge of a laptop display screen.

5. The case of claim 1 wherein said enclosure includes a region to receive a cable coupled on one end to said antenna and connectable on the opposite end to said card.

6. The case of claim 5 including a cable organizer to hold said cable.

7. The case of claim 1 wherein one of said portions includes a dipole antenna.

8. The case of claim 1 including a catch to secure said case to a laptop screen, said upper and lower portions coupled by a hinge, to extend said lower portion above said screen and said upper portion along said screen.

9. The case of claim 8 wherein said catch being pivotable into a retracted position within said case when not in use and may be pivotable to engage the upper edge of laptop computer screen so as to extend the antenna above said laptop computer screen.

10. The case of claim 1 wherein said enclosure includes a pair of pivotally connected portions, one of which includes said antenna, said portions being pivotal relative to one another.

11. A method comprising:
    enabling a carrying case for a personal computer card to act as an antenna for that personal computer card after said card is removed from said case and inserted in a personal computer; and
    enabling the carrying case to be latched atop a laptop computer screen.

12. The method of claim 11 including enabling the carrying case to be hingedly opened to remove said card from said carrying case.

13. The method of claim 11 including enabling the carrying case to be rotated from a folded configuration to an elongated configuration for mounting on said display screen of said laptop.

14. The method of claim 11 including pivotally connecting a pair of portions to form said carrying case and enabling said portions to be angularly displaced with respect to one another.

15. A personal computer card assembly comprising:
    a personal computer card;
    an enclosure to removably receive said personal computer card, said card being removable from said enclosure for insertion into a personal computer, wherein said enclosure includes an upper portion and a lower portion hingedly connected to one another; and
    an antenna permanently secured to said enclosure and electrically connectable to said card when said card is in position within a personal computer.

16. The assembly of claim 15 wherein said enclosure is openable to allow access to the card.

17. The assembly of claim 15 wherein said enclosure includes a catch to secure said enclosure to a personal computer's display screen.

18. The assembly of claim 17 wherein said catch to engage an upper edge of a laptop display screen.

19. The assembly of claim 15 wherein said enclosure includes a region to receive a cable coupled on one end to said antenna and connectable on the opposite end to said card.

* * * * *